(12) United States Patent
Hsu

(10) Patent No.: US 11,086,945 B2
(45) Date of Patent: Aug. 10, 2021

(54) SYSTEM AND METHOD FOR UPDATING UPLOAD-PERIOD OF APPARATUS DATA

(71) Applicant: Chicony Power Technology Co., Ltd., New Taipei (TW)

(72) Inventor: Ya-Huei Hsu, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 421 days.

(21) Appl. No.: 16/194,040

(22) Filed: Nov. 16, 2018

(65) Prior Publication Data

US 2020/0074003 A1 Mar. 5, 2020

(30) Foreign Application Priority Data

Aug. 30, 2018 (TW) .................. 107130380

(51) Int. Cl.
| | | |
|---|---|---|
| *G06F 16/951* | (2019.01) | |
| *H04L 29/08* | (2006.01) | |
| *H04L 29/06* | (2006.01) | |
| *H04L 12/28* | (2006.01) | |
| *H04L 12/26* | (2006.01) | |

(52) U.S. Cl.
CPC ........ *G06F 16/951* (2019.01); *H04L 12/2823* (2013.01); *H04L 29/08675* (2013.01); *H04L 43/067* (2013.01); *H04L 65/4023* (2013.01); *H04L 67/10* (2013.01); *H04L 67/12* (2013.01); *H04L 67/22* (2013.01); *H04L 67/325* (2013.01)

(58) Field of Classification Search
CPC . H04L 12/2823–2836; H04L 29/08558; H04L 41/22; H04L 43/04–0817; H04L 67/12–125; G05B 19/4185
See application file for complete search history.

(56) References Cited

U.S. PATENT DOCUMENTS

| | | |
|---|---|---|
| 8,190,082 B2 | 5/2012 | Robinson |
| 8,260,357 B2 | 9/2012 | Likar et al. |
| 8,930,422 B2 | 1/2015 | Black |

(Continued)

FOREIGN PATENT DOCUMENTS

| | | |
|---|---|---|
| CN | 101835237 A | 9/2010 |
| CN | 103037467 B | 4/2013 |

(Continued)

*Primary Examiner* — Brendan Y Higa
(74) *Attorney, Agent, or Firm* — Muncy, Geissler, Olds & Lowe, P.C.

(57) ABSTRACT

A system for updating upload-period of apparatus data is provided. The system includes a server, a database and an apparatus-status collecting unit interconnected through the Internet. The apparatus-status collecting unit keeps collecting apparatus data generated by at least one apparatus while the apparatus performs its function, and periodically uploads the collected apparatus data to the database for storing according to an upload-period. The server records usage information whenever the apparatus data stored in the database has been accessed. The server then calculates an adjusting parameter based on the usage information, and broadcasts the adjusting parameter to the apparatus-status collecting unit. Therefore, the apparatus-status collecting unit may update the currently-adopted upload-period according to the adjusting parameter.

17 Claims, 6 Drawing Sheets

(56) References Cited

U.S. PATENT DOCUMENTS

| | | |
|---|---|---|
| 9,307,413 B2 | 4/2016 | Lenzini et al. |
| 9,372,479 B1 | 6/2016 | Phillips et al. |
| 9,621,489 B2 | 4/2017 | Carey et al. |
| 9,807,619 B2 | 10/2017 | Tsai et al. |
| 9,887,940 B2 | 2/2018 | Carey et al. |
| 2002/0198984 A1* | 12/2002 | Goldstein ............... H04L 67/22 709/224 |
| 2013/0255681 A1 | 10/2013 | Batch et al. |
| 2016/0285707 A1* | 9/2016 | Pawlowski ......... G06F 3/04842 |
| 2017/0048864 A1 | 2/2017 | Ngo et al. |
| 2018/0091326 A1* | 3/2018 | McLaughlin ....... H04L 41/0893 |
| 2019/0296971 A1* | 9/2019 | Clark .................. H04L 41/5074 |

FOREIGN PATENT DOCUMENTS

| | | |
|---|---|---|
| TW | 200844895 A | 11/2008 |
| TW | 201019224 A | 5/2010 |

* cited by examiner

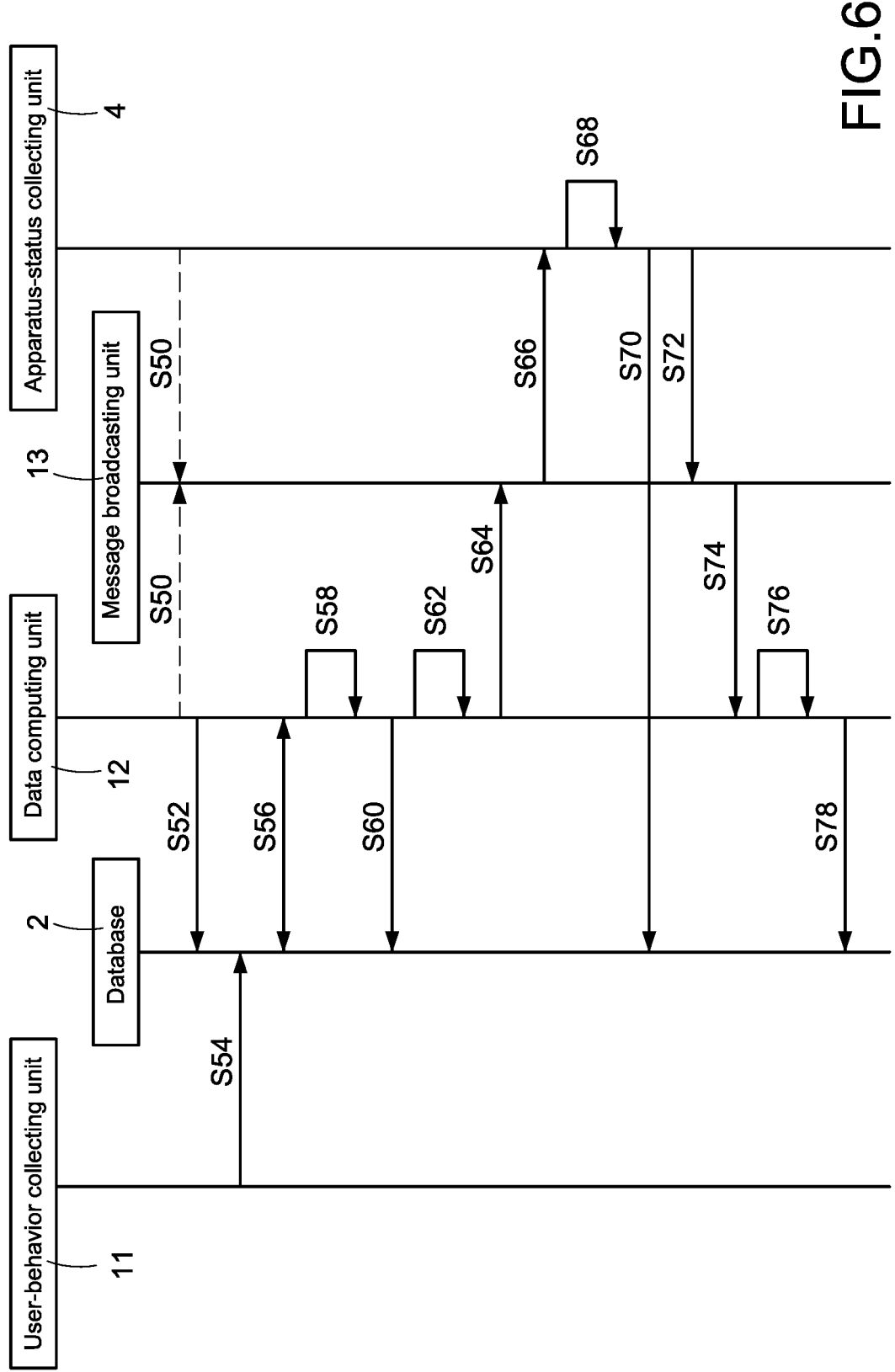

SYSTEM AND METHOD FOR UPDATING UPLOAD-PERIOD OF APPARATUS DATA

BACKGROUND OF THE INVENTION

1. Technical Field

The technical relates to an uploading system and uploading method for uploading apparatus data, and specifically relates to a system and a method for updating an upload-period of apparatus data.

2. Description of Related Art

Following the development of the Internet, smart buildings and Internet of Thing (IoT) equipment are becoming more popular recently. Furthermore, according to the prevalence of big-data-analysis technique, the data collected by these IoT equipment are getting more important.

For the purpose of constructing a system as soon as possible and also reducing the construction fee, many companies now are willing to use the cloud services currently-provided by other enterprises, such as Amazon Web Service (AWS) provided by Amazon. In general, these cloud services usually charge the user for the network traffic of their system. Since the IoT equipment may persistently transmit the data that they've stored, sensed or measured to the server according to the real demand, the network traffic and cost will be massive.

Parts of the companies also rent and use the existing cloud server(s) provided by other enterprises directly with ease. However, this kind of service which provides the rental of the cloud servers are charging for the calculation amount of each server, i.e., if the cloud servers have high data amount or high calculation amount, then the companies need to pay a high cost. Accordingly, how to reduce the cost for the companies in using the aforementioned services, is really a matter of the technical field.

SUMMARY OF THE INVENTION

The invention is about a system and a method for updating upload-period of apparatus data, which may adjust the upload-period adopted for periodically uploading the apparatus data to a database based on the frequency that how often a user accesses the apparatus data.

In one of the exemplary embodiments of the present invention, the system for updating upload-period of apparatus data includes a server, a database and an apparatus-status collecting unit. The server at least includes a user-behavior collecting unit, a data computing unit and a message broadcasting unit. The apparatus-status collecting unit continually collects apparatus data generated by an apparatus while the apparatus is performing its functions, and the apparatus-status collecting unit periodically uploads the collected apparatus data to the database for storing according to a preset upload-period. The server uses the user-behavior collecting unit to collect usage information generated while the apparatus data stored in the databased is accessed by the user, uses the data computing unit to calculate an adjusting parameter according to the usage information, and uses the message broadcasting unit to broadcast the adjusting parameter to the apparatus-status collecting unit. Therefore, the apparatus-status collecting unit may update the upload-period according to the adjusting parameter.

In one of the exemplary embodiments of the present invention, the method for updating upload-period of apparatus data includes the following steps: a) generating a threshold upper limit and a threshold lower limit according to a default parameter and storing the threshold upper limit and the threshold lower limit in a database by a server; b) continually collecting an apparatus data from at least one apparatus and periodically uploading the collected apparatus data to the database according to an upload-period by an apparatus-status collecting unit; c) collecting usage information generated while the apparatus data stored in the databased is accessed by a user-behavior collecting unit of the server; d) calculating a usage heat of the apparatus data according to the usage information by a data computing unit of the server; e) generating a first adjusting parameter when the usage heat is determined higher than the threshold upper limit and generating a second adjusting parameter when the usage heat is determined lower than the threshold lower limit by the data computing unit; f) broadcasting the first adjust parameter or the second adjusting parameter to the apparatus-status collecting unit by a message broadcasting unit of the server; and g) shortening the upload-period according to the first adjusting parameter or extending the upload-period according to the second adjusting parameter by the apparatus-status collecting unit.

In comparison with related art, the present invention may dynamically adjust the upload-period that is adopted for uploading the apparatus data to a server based on the frequency of a user that actually accesses the apparatus data, therefore, the network traffic can be released, and also the apparatus resources can be prevented from being insufficient.

BRIEF DESCRIPTION OF THE DRAWINGS

FIG. 6 is a first embodiment of an action timing diagram of the present invention.

DETAILED DESCRIPTION OF THE INVENTION

The technical contents and detailed description of the present invention are described thereinafter according to multiple embodiments and the attached drawings, being not used to limit its executing scope. Any equivalent variation and modification made according to appended claims is all covered by the claims claimed by the present invention.

Figure 1:
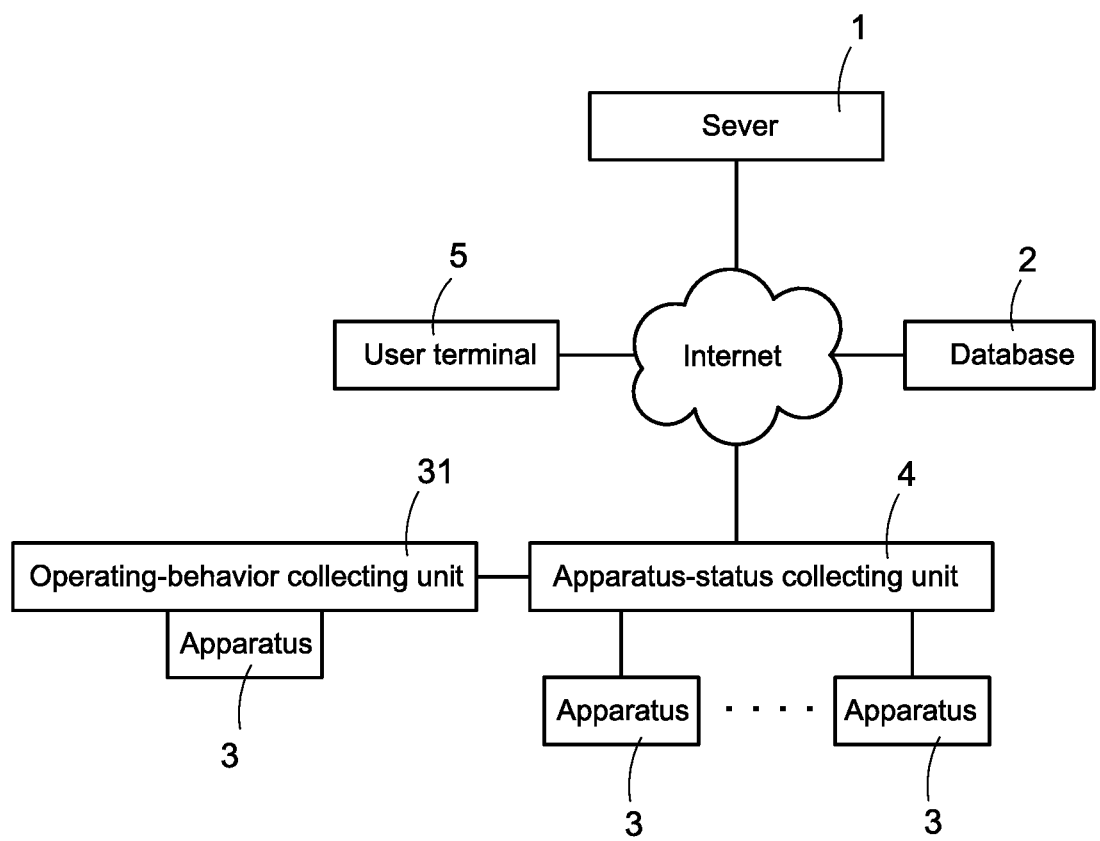
FIG. 1 is a first embodiment of a schematic diagram showing an updating system of the present invention.

FIG. 1 is a first embodiment of a schematic diagram showing an updating system of the present invention. The present invention discloses a system for updating upload-period of apparatus data (referred to as the updating system), as shown in FIG. 1, the updating system is mainly including a server 1, a database 2 and an apparatus-status collecting unit 4, wherein the server 1, the database 2 and the apparatus-status collecting unit 4 are interconnected with each other through the Internet. The apparatus-status collecting unit 4 is connected with one or more apparatuses 3 at a time.

In the embodiment, the apparatus 3 may be each type of IoT equipment, such as smart water meter, smart watthour meter, smart air-conditioner, smart lamp, etc., which is applied to a smart building, but not limited thereto.

Figure 2A:
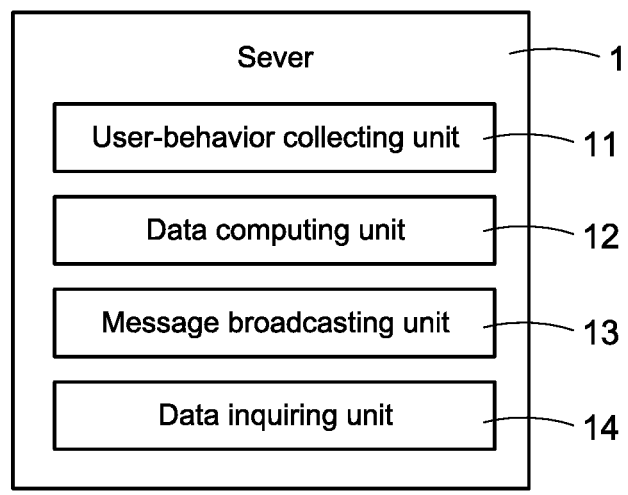
FIG. 2A is a first embodiment of a block diagram showing a server of the present invention.
Figure 2B:
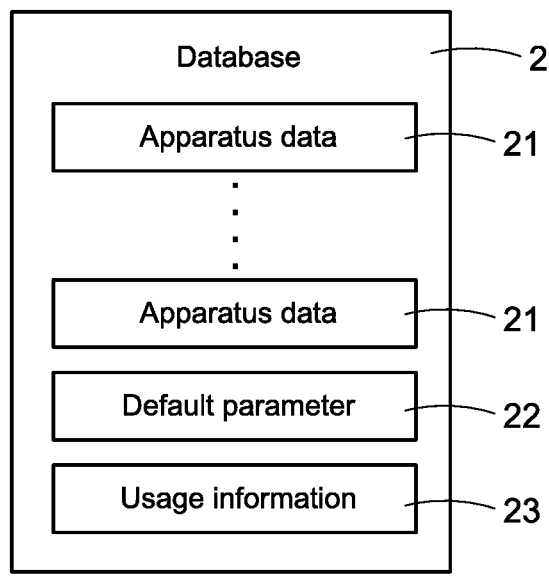
FIG. 2B is a first embodiment of a block diagram showing a database of the present invention.

FIG. 2A is a first embodiment of a block diagram showing a server of the present invention, FIG. 2B is a first embodiment of a block diagram showing a database of the present invention. As shown in FIG. 2A, the server 1 is mainly including a user-behavior collecting unit 11, a data computing unit 12 and a message broadcasting unit 13. In particular, the user-behavior collecting unit 11, the data computing unit 12 and the message broadcasting unit 13 may be hardware units that are respectively arranged inside the server 1, or be virtual units that are generated by software executed by the server 1.

In the embodiment, the apparatus 3 is basically arranged in a smart building (not shown). The apparatus 3 is used for executing specific apparatus function(s), for example, a smart water meter is used to record real-time water consuming amount, a smart watthour meter is used to record real-time electricity consuming amount, etc. Also, the apparatus 3 generates corresponding apparatus data 21 after/while executing such specific function. The apparatus-status collecting unit 4 is connected with at least one apparatus 3 through wired or wireless manner, and the apparatus-status collecting unit 4 applied to collect the apparatus data 21 from the apparatus 3 which is connected thereto.

In one embodiment, the updating system of the present invention may simultaneously include a plurality of apparatus-status collecting units 4, each of the apparatus-status collecting units 4 is separately used to collect the apparatus data 21 from different apparatuses 3. In another embodiment, the apparatus-status collecting unit 4 may be embedded inside the aforementioned apparatus 3, and the apparatus 3 may use the apparatus-status collecting unit 4 as its wireless transmitting unit. In further embodiment, the apparatus-status collecting unit 4 may be simultaneously connected with a plurality of relevant apparatuses 3 (such as multiple apparatuses 3 with same type, multiple apparatuses 3 arranged at same floor, etc.), so as to collect the apparatus data 3 from these apparatuses 3 at once. However, the above description is only about parts of the possible embodiments, not intended to limit the scope of the present invention. For the sake of understanding, only one apparatus-status collecting unit 4 for collecting the apparatus data 3 from one apparatus 3 will be taken as an example in the following.

In the present invention, the updating system may have a default upload-period. The aforementioned apparatus-status collecting unit 4 continually collects the apparatus data 21 from the connected apparatus 3, and periodically uploads the collected apparatus data 21 to the database 2 for storing according to the upload-period.

More specific, the updating system in the present invention may set different upload-periods for different types of apparatuses 3. For an instance, if the apparatus 3 is a smart watthour meter, the updating system may previously set the upload-period associated with the smart watthour meter as ten minutes due to the relative-high consuming amount of electricity (i.e., the apparatus-status collecting unit 4 will keep collecting data from the smart watthour meter and upload the collected data to the database 2 in every ten minutes). For another instance, if the apparatus 3 is a smart water meter, the updating system may previously set the upload-period associated with the smart water meter as one hour due to the relative-low consuming amount of water (i.e., the apparatus-status collecting unit 4 will keep collecting data from the smart water meter and upload the collected data to the database 2 once an hour), and so on.

In the present invention, a user may remotely operate a user terminal 5, such as a personal computer, a smart phone, a tablet, etc., and uses the user terminal 5 to connect to the updating system, so as to access the apparatus data 21 that have been stored in the database 2 of the updating system. In particular, the updating system may provide a human-machine interface (not shown). After logging into the updating system, the user may select, upon the human-machine interface, a target apparatus 3 such as a smart water meter arranged at second floor or a smart air-conditioner arranged at fifth floor, and also an attribute of the apparatus 3 (for example, temperature or humidity of the smart air-conditioner). After receiving the above user operation, the updating system may access the database 2 according to the user operation and retrieves the apparatus data 21 corresponding to the content of the user operation for being displayed on the human-machine interface, so the user may check the apparatus data 21 on the human-machine interface.

In the present invention, the server 1 may collect usage information 23 through the user-behavior collecting unit 11 while the user inquires the apparatus data 21 according to the aforementioned approaches (for example, through the user terminal 5 and the human-machine interface), wherein the usage information 23 is generated due to the access of the apparatus data 21 stored in the database 2. More specific, each of the inquiring actions (detailed in the following) initiated by the user for inquiring the apparatus data 21 stored in the database 2 will be recorded in the usage information 23. Next, the server 1 may use the data computing unit 12 to calculate a set of adjusting parameters according to the usage information 23, wherein the calculated adjusting parameter is corresponding to the detail of the inquiring action(s) of the user.

Next, the server 1 may use the message broadcasting unit 13 to broadcast the set of adjusting parameters. After receiving the adjusting parameter broadcasted from the message broadcasting unit 13, the apparatus-status collecting unit 4 may then update the currently-adopted upload-period according to the received adjusting parameter.

If a user frequently inquires the apparatus data 21 of an apparatus-A, the relevant data which is sensed or measured by the apparatus-A must be important to the user. In this scenario, the data computing unit 12 may generate a first adjusting parameter based on these inquiring actions. After an apparatus-status collecting unit-A which is connected with the apparatus-A receives the first adjusting parameter, it can then shorten its upload-period that is currently-adopted for uploading the apparatus data 21 of the apparatus-A to the database 2 according to the first adjusting parameter. Therefore, the user may obtain a more accurate, detailed result while inquiring the apparatus data 21 associated with the apparatus-A afterward.

For another instance, if a user inquires the apparatus data 21 of an apparatus-B less (such as once every ten days), the relevant data which is sensed or measured by the apparatus-B must be less important to the user. In this scenario, the data computing unit 12 may generate a second adjusting parameter based on these inquiring actions. After an apparatus-status collecting unit-B which is connected with the apparatus-B receives the second adjusting parameter, it can then extend its upload-period that is currently-adopted for uploading the apparatus data 21 of the apparatus-B to the database 2 according to the second adjusting parameter.

Therefore, the user may obtain a general result while inquiring the apparatus data 21 associated with the apparatus-B afterward.

It is worth saying that the apparatus-status collecting unit-B extends its upload-period due to the less inquiring action(s) of the user, therefore, the network traffic of the apparatus-status collecting unit-B can be greatly released, and the resources used and required by the apparatus-status collecting unit-B can also be decreased.

As shown in FIG. 2A, the server 1 may further include a data inquiring unit 14 (such as the aforementioned human-machine interface). The data inquiring unit 14 may receive an external operation from the user (for example, the inquiring actions initiated by the user through the user terminal 5), retrieves the apparatus data 21 from the database 2 according to the content of the external operation, and displays the retrieved apparatus data 21. In the present invention, the server 1 can not only provide and display the relevant data based on user's request, but also collect a usage heat of the user aimed at each apparatus 3, so as to dynamically adjust the aforementioned upload-period according to the usage heat. As a result, the network traffic of the present invention can be effectively released, and the apparatus resources can be prevented from being insufficient.

Figure 3:
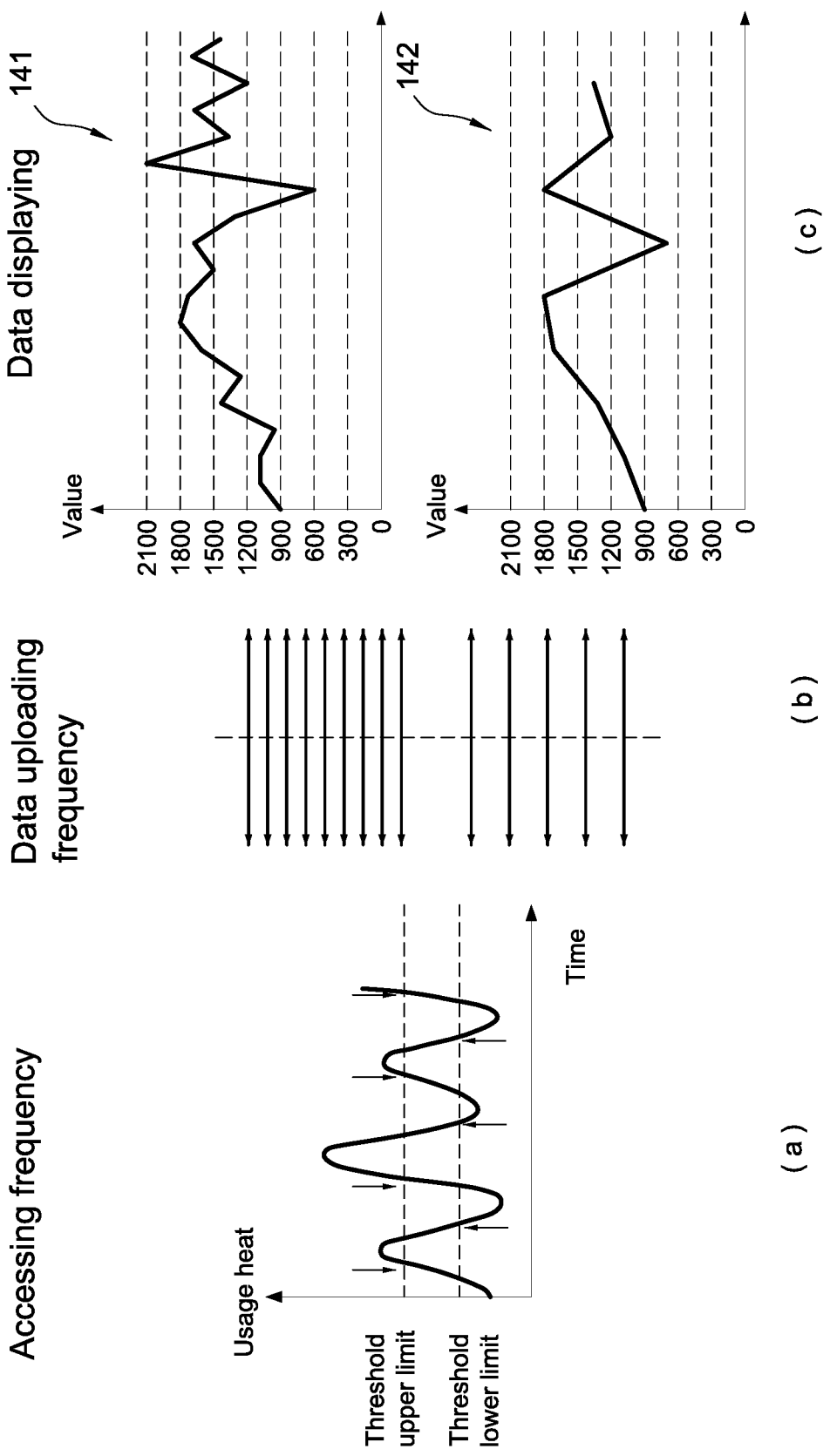
FIG. 3 is a first embodiment of a schematic diagram showing an apparatus data collecting frequency of the present invention.

FIG. 3 is a first embodiment of a schematic diagram showing an apparatus data collecting frequency of the present invention. As shown in FIG. 3(*a*), when a user operates the user terminal 5 for logging into the server 1, the server 1 may receive the external operation from the user terminal 5 through the data inquiring unit 14. Meanwhile, the server 1 may record the usage information 23 associated with the external operation through the user-behavior collecting unit 11, so the server 1 may calculate the usage heat of the user aimed at each apparatus data 21 of each apparatus 3 through the data computing unit 12. In an embodiment, the usage information 23 may be, for example, a usage duration of the user staying at the data inquiring unit 14 (i.e., the time-length of using the human-machine interface), an extracting-frequency/extracting-number/extracting-amount of each apparatus data 21, an attribute of the extracted apparatus data 21, but not limited thereto.

By monitoring and collecting the usage information 23, the server 1 may effectively calculate the usage heat of the user in accessing each apparatus data 21 of each apparatus 3. In particular, the server 1 is using the data computing unit 12 to calculate the usage heat according to the usage duration, the extracting-frequency, a weight of the attribute of each apparatus data 21, etc., therefore, the server 1 may use the data computing unit 12 to then calculate the aforementioned adjusting parameter based on the calculated usage heat.

As shown in FIG. 3(*a*) and FIG. 3(*b*), the server 1 in the present invention may previously or dynamically generate a threshold upper limit and a threshold lower limit. When the usage heat corresponding to an apparatus data 21 of a first apparatus is calculated and determined higher than the threshold upper limit, the server 1 may use the data computing unit 12 to generate a first adjusting parameter for the apparatus-status collecting unit 4 to shorten its upload-period which is currently adopted for uploading the apparatus data 21 of the first apparatus to the database 2 (i.e., the server 1 will have a higher, intensive collecting frequency). On the other hand, when the usage heat corresponding to an apparatus data 21 of a second apparatus is calculated and determined lower than the threshold lower limit, the server 1 may use the data computing unit 12 to generate a second adjusting parameter for the apparatus-status collecting unit 4 to extend its upload-period which is currently adopted for uploading the apparatus data 21 of the second apparatus to the database 2 (i.e., the server 1 will have a lower collecting frequency).

In one embodiment, the database 2 may store a default parameter 22. The data computing unit 12 may calculate the aforementioned threshold upper limit and the threshold lower limit based on the default parameter 22 before the database 2 is accessed by the user, therefore, an adjusting timing for adjusting the upload-period currently-adopted by the apparatus-status collecting unit 4 can be assured.

In another embodiment, the server 1 may monitor the inquiring actions of the user that is performed at the data inquiring unit 14, such as an inquiring depth, an inquiring keyword, an inquiring amount, an operating approach, etc., and dynamically adjusts the threshold upper limit and the threshold lower limit according to the above inquiring actions. For example, if the usage heat is determined higher than the threshold upper limit, the server 1 may slightly increase the threshold upper limit according to the user's inquiring actions. Therefore, even if the user initiates extreme inquiring actions and these inquiring actions continually trigger the threshold upper limit or the threshold lower limit, the current upload-period can be prevented from being frequently adjusted.

It is worth saying that the server 1 in the previous embodiment is using the user-behavior collecting unit 11 to collect an accessing frequency of the user in accessing the database 2, so as to calculate the usage heat based on the accessing frequency. In other embodiment, however, the server 1 may also calculate the usage heat according to an operating frequency of the user in directly operating or using the apparatus 3.

As shown in FIG. 1, the updating system of the present invention may further include an operating-behavior collecting unit 31 connected with the apparatus 3. The operating-behavior collecting unit 31 may be, for example, one or more sensors arranged inside the apparatus 3, but not limited thereto. While the user directly operates the apparatus 3 (for example, turns on or turns off a smart lamp, adjusts the temperature of a smart air-conditioner, etc.), the operating-behavior collecting unit 31 may record an operating information of the user upon the apparatus 3. In the embodiment, the above operating information may be, for example, an operating duration, an operating amount, an operating content, etc. of the user in operating the apparatus 3. Therefore, the data computing unit 12 of the server 1 may calculate the usage heat of the user associated with the apparatus 3 according to the operating information, and the data computing unit 12 may then generate the aforementioned first adjusting parameter/second adjusting parameter according to the usage heat.

The present invention has another technical feature, which is that the server 1 may adjust not only the upload-period adopted by the apparatus-status collecting unit 4, but also the data content displayed by the data inquiring unit 14 based on the usage heat.

In particular, the apparatus data 21 stored in the database 2 will be read and transformed by the data computing unit 12 of the server 1 according to a default data transforming period. More specific, the data computing unit 12 is to periodically read the apparatus data 21 (such as digital information) from the database 2 and transform the apparatus data 21 into some certain formats which can be easily displayed and well understood. When the user requests to inquire the apparatus data 21, the apparatus data 21 being transformed by the data computing unit 12 will be retrieved by the data inquiring unit 14. In one embodiment, the data computing unit 12 may correspondingly generate a data displaying scale according to the content of the data transforming period. When the user requests to inquire the apparatus data 21, the data inquiring unit 14 will retrieve and display the transformed apparatus data 21 by way of a diagram or a chart according to the data displaying scale for the user to check with ease.

As shown in FIG. 3(*c*), once the usage heat of the user aimed at an apparatus data 21 is high, the data transforming period will be short relatively, and the data displaying scale adopted by the data inquiring unit 14 will be relative small (i.e., the data displaying scale is proportional to the data transforming period). In this embodiment, the user may obtain a first display interface 141 showing sharp and accurate data upon the data inquiring unit 14. On the other hand, once the usage heat of the user aimed at an apparatus data 21 is low, the data transforming period will be long relatively, and the data displaying scale adopted by the data inquiring unit 14 will be relative big (i.e., the data displaying scale is proportional to the data transforming period). In this embodiment, the user may obtain a second display interface 142 showing smooth and general data upon the data inquiring unit 14.

It is worth saying that the data computing unit 12 of the present invention will update the aforementioned data transforming period based on the content of the updated upload-period of the apparatus-status collecting unit 4, and it may also update the aforementioned data displaying scale based on the content of the updated data transforming period. In the embodiment, the updated data transforming period will be slightly longer than the updated upload-period, therefore, it can be sured that the data being transformed by the data computing unit 12 every time will always be the latest version of data. Besides, the updated data displaying scale is proportional to the updated data transforming period. If the data transforming period adopted by the data computing unit 12 is short (i.e., transforming with high frequency), the data displayed in the diagram or the chart obtained by the user will be more accurate. If the data transforming period adopted by the data computing unit 12 is long (i.e., transforming with low frequency), the data displayed in the diagram or the chart obtained by the user will be more general.

Figure 4:
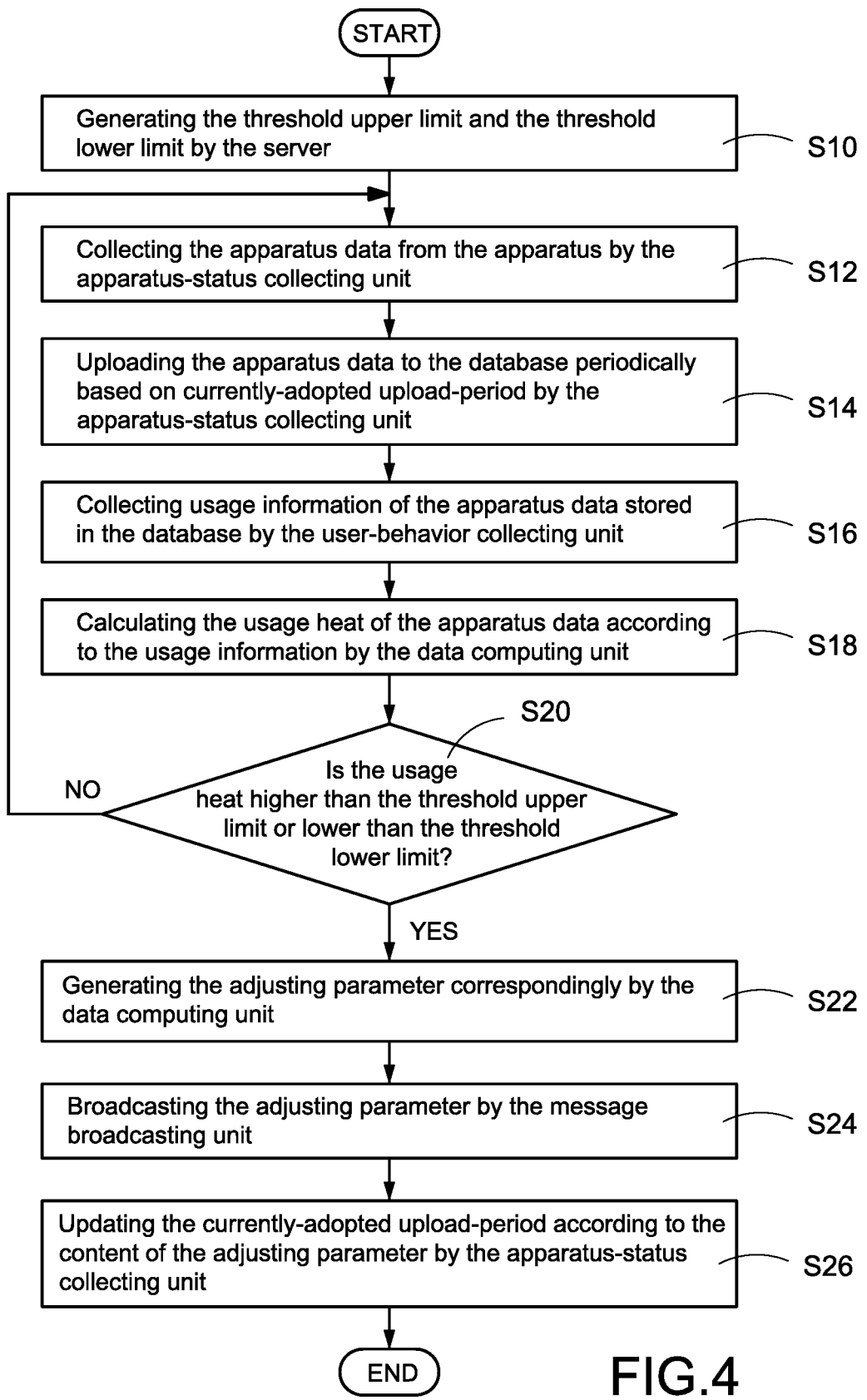
FIG. 4 is a first embodiment of an updating flowchart for upload-period of the present invention.

FIG. 4 is a first embodiment of an updating flowchart for upload-period of the present invention. The present invention also discloses a method for updating the upload-period of the apparatus data (referred to as the updating method), wherein the updating method is basically adopted by the updating system as shown in FIG. 1, FIG. 2A and FIG. 2B in a non-limiting way.

As shown in FIG. 4, the server 1 may first generate the threshold upper limit and the threshold lower limit according to a pre-stored default parameter 22 (step S10), and the server 1 may store the threshold upper limit and the threshold lower limit in the database 2. After the updating system is operating, the apparatus-status collecting unit 4 continually collects apparatus data 21 from at least one apparatus 3 (step S12), wherein the apparatus data 21 is generated by the apparatus 3 after the apparatus 3 is activated and executes its specific function(s). General speaking, the apparatus-status collecting unit 14 may keep collecting the apparatus data 21 (such as every second), or collects the apparatus data 21 regularly (such as every five minutes), or passively activates its collecting action whenever new apparatus data 21 is generated by the apparatus 3, not limited thereto.

Next, the apparatus-status collecting unit 4 periodically uploads the collected apparatus data 21 to the database 2 for storing based on a currently-adopted upload-period (step S14).

Once the apparatus data 21 from the one or more apparatuses 3 within the updating system are uploaded and stored in the database 2, a user may login into the updating system for inquiring these apparatus data 21 from the database 2.

In the present invention, the server 1 may use the user-behavior collecting unit 11 to collect usage information 23 which is generated while the apparatus data 21 inside the database 2 is accessed (step S16), and uses the data computing unit 12 to calculate usage heat of the apparatus data 21 according to the usage information 23 (step S18). In the embodiment, higher usage heat indicates that the access from the user aim at the apparatus data 21 is more frequent, and lower usage heat indicates that the access from the user aim at the apparatus data 21 is less frequent.

In the embodiment, the server 1 is using the data inquiring unit 14 to receive user's external operations for accessing the apparatus data 21 from the database 2, and is using the data inquiring unit 14 to display the extracted apparatus data 21. Also, the server 1 uses the user-behavior collecting unit 11 to record the usage information 23 while the data inquiring unit 14 is receiving the external operations from the user.

As mentioned above, the usage information 23 can be, for example, the usage duration of the user staying at the data inquiring unit 14, the extracting frequency of each apparatus data 21, the attribute of each apparatus data 21, etc. In the step S18, the data computing unit 12 is mainly calculating the usage heat based on the usage duration, the extracting frequency, and a weight of the attribute of each apparatus data 21. In other words, the usage heat of the present invention is directly associated with the inquiring actions the user performed on the server 1.

In another embodiment, the apparatus 3 may also be connected with the operating-behavior collecting unit 31 as shown in FIG. 1. When the user operates or utilizes the apparatus 3, the operating-behavior collecting unit 31 may record the operating information associated with the user and transmit the operating information to the server 1. In the step S18, the data computing unit 12 may calculate the usage heat of the user aimed at the apparatus 3 according to the operating information. In other words, the usage heat of the present invention may also be directly associated with the operating actions the user performed directly on the apparatus 3.

After the step S18, the data computing unit 12 determines whether the usage heat is higher than the threshold upper limit or lower than the threshold lower limit (step S20). If the usage heat is determined neither higher than the threshold upper limit nor lower than the threshold lower limit, the server 1 goes back to the step S12 for continually receiving the apparatus data 21 uploaded from the apparatus-status collecting unit 4, continually collecting the usage information 23 of the user, and continually calculating the usage heat.

If the data computing unit 12 determines that the usage heat is higher than the threshold upper limit or lower than the threshold lower limit, it then correspondingly generates an adjusting parameter (step S22). In particular, the data computing unit 12 in the step S22 is to generate a first adjusting parameter for shortening the upload-period when determining that the usage heat is higher than the threshold upper limit, and to generate a second adjusting parameter for extending the upload-period when determining that the usage heat is lower than the threshold lower limit.

After the step S22, the server 1 uses the message broadcasting unit 13 to broadcast the adjusting parameter (step S24), i.e., to alternatively broadcast the first adjusting parameter or the second adjusting parameter. After receiving the adjusting parameter broadcasted from the message broadcasting unit 13, the apparatus-status collecting unit 4 may update its currently-adopted upload-period according to the received adjusting parameter (step S26). Specifically, the apparatus-status collecting unit 4 is to shorten the currently-adopted upload-period according to the content of the first adjusting parameter after receiving the first adjusting parameter (i.e., to increase its upload frequency), and to extend the currently-adopted upload-period according to the content of the second adjusting parameter after receiving the second adjusting parameter (i.e., to decrease its upload frequency).

For an instance, the apparatus 3 may be a smart water meter arranged inside a smart building, the apparatus-status collecting unit 4 continually collects data from the smart water meter and periodically uploads the collected data to the database 2 according to a preset upload-period (such as once every thirty minutes). In this instance, the threshold lower limit can be one hour for example, and the user inquires the data of the smart water meter from the database 2 in every twenty-four hours, which is far lower than the threshold lower limit. In this scenario, the data computing unit 12 may generate the second adjusting parameter according to the usage heat of the user aim at the smart water meter, so as to make the apparatus-status collecting unit 4 to extend its upload-period (for example, extends to upload the collected data in every twelve hours). After extending the upload-period, the network traffic can be effectively reduced and the usage amount of the network can be saved.

For another instance, the apparatus 3 may be a smart air-conditioner arranged inside the smart building, the apparatus-status collecting unit 4 continually collects data from the smart air-conditioner and periodically uploads the collected data to the database 2 according to a preset upload-period (such as once every thirty minutes). In this instance, the threshold upper limit can be twenty minutes for example, however, the user inquires the data of the smart air-conditioner from the database 2 in every five minutes, which is higher than the threshold upper limit. In this scenario, the data computing unit 12 may generate the first adjusting parameter according to the usage heat of the user aime at the smart air-conditioner, so as to make the apparatus-status collecting unit 4 to shorten its upload-period (for example, shortens to upload the collected data in every minute). Therefore, the user may obtain the accurate data relevant to the smart air-conditioner.

Figure 5:
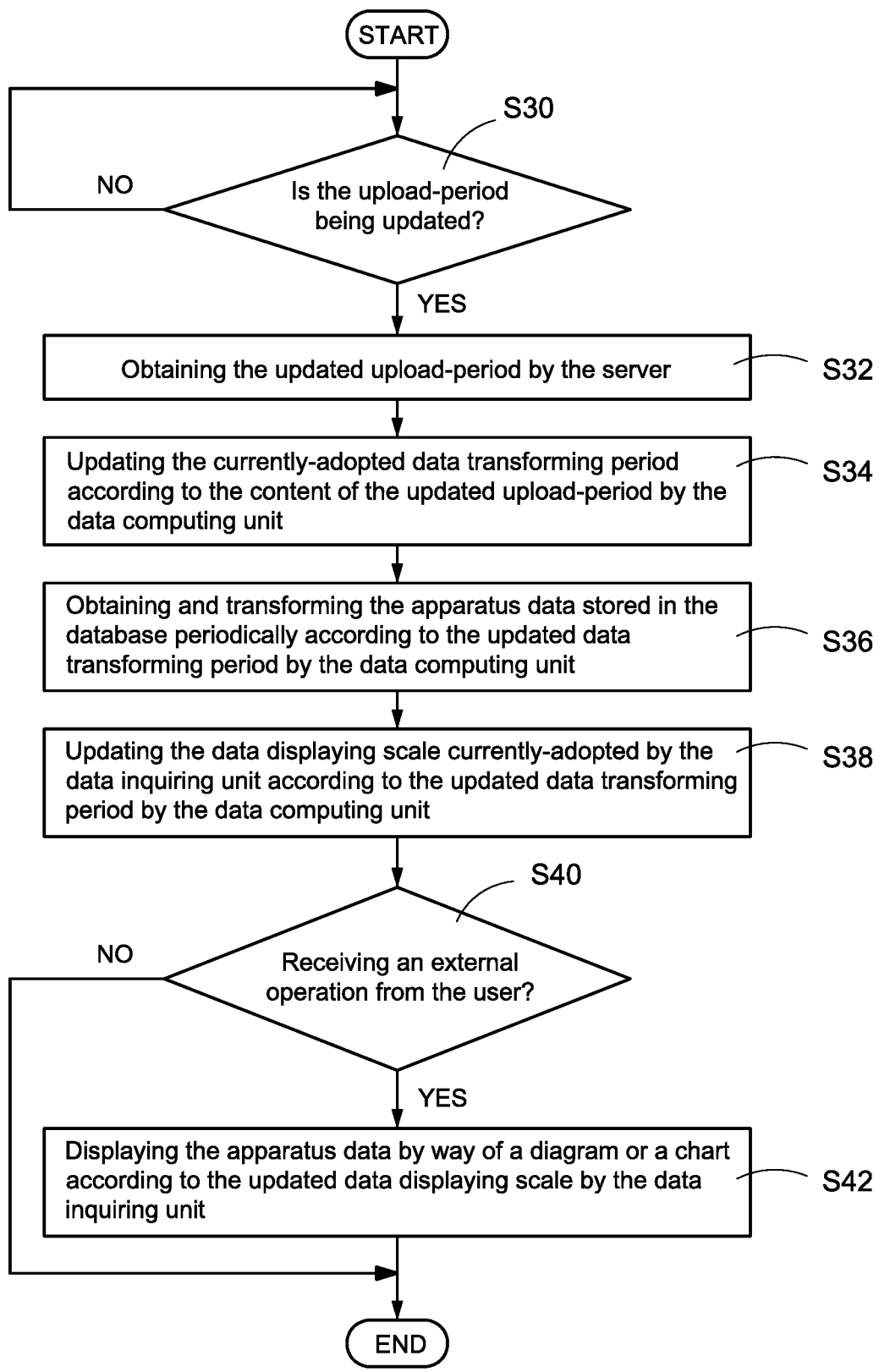
FIG. 5 is a first embodiment of a flowchart for updating displayed data of the present invention.

FIG. 5 is a first embodiment of a flowchart for updating displayed data of the present invention.

As shown in FIG. 5, the server 1 may keep determining whether the upload-period of the apparatus-status collecting unit 4 is updated or not (step S30), and obtains an updated upload-period when determining that the upload-period currently adopted by the apparatus-status collecting unit 4 does have been updated (step S32). After receiving the updated upload-period, the server 1 uses the data computing unit 12 to update the currently-adopted data transforming period according to the content of the updated upload-period (step S34). In particular, the data computing unit 12 is to shorten the data transforming period according to the content of a shortened upload-period, or to extend the data transforming period according to the content of an extended upload-period.

It is worth saying that the updated data transforming period will be slightly longer than the updated upload-period, therefore the data being transformed by the data computing unit 12 every time can be assured as the latest version of data which has just been uploaded.

After the step S34, the apparatus data 21 stored in the database 2 may be periodically obtained and transformed by the data computing unit 12 according to the updated data transforming period (step S36). Also, the data computing unit 12 may update the data displaying scale currently adopted by the data inquiring unit 14 according to the content of the updated data transforming period (step S38), wherein the updated data displaying scale is proportional to the updated data transforming period.

During the operation of the updating system, the server 1 keeps determining whether the data inquiring unit 14 receives an external operation from the user or not (step S40). When receiving the external operation from the user (such as receiving an operation for inquiring the apparatus data 21 from the database 2), the data inquiring unit 14 may display the transformed apparatus data 21 thereon by way of a diagram or a chart according to the updated data displaying scale for the user to check with ease (step S42).

As mentioned above, the data displaying scale of the present invention is proportional to the data transforming period (also, the updated data displaying scale is proportional to the updated data transforming period), the data transforming period is proportional to the upload-period adopted by the apparatus-status collecting unit 4, and the upload-period is proportional to the usage heat of the user aimed at each apparatus 3 or each apparatus data 21. The present invention may shorten an upload-period and a data transforming period of a specific data and adopt a detailed data displaying scale for the user to obtain an accurate inquiring result whenever the user has a strong demand on the data (i.e., the usage heat aimed at the data is high). On the other hand, the present invention may also extend an upload-period and a data transforming period of a specific data and adopt a broad data displaying scale for the user to obtain a general inquiring result whenever the user has only a slight demand on the data (i.e., the usage heat aimed at the data is low). In this manner, the network traffic will be released and the consuming amount of the apparatus resources will be reduced.

FIG. 6 is a first embodiment of an action timing diagram of the present invention. FIG. 6 is used to detail the operating order of each unit within the updating system in a non-limiting way.

Step S50: The data computing unit 12 and the apparatus-status collecting unit 4 respectively register to the message broadcasting unit 13, so as to subscribe the data set from the message broadcasting unit 13 for instant message notification.

Step S52: The data computing unit 12 calculates the threshold upper limit and the threshold lower limit according to the default parameter 22 and stores the threshold upper limit and the threshold lower limit to the database 2.

Step S54: The user-behavior collecting unit 11 keeps collecting usage information 23 (including the usage duration of the user staying at the data inquiring unit 14, the extracting frequency of specific apparatus data 21, etc.), and stores the usage information 23 to the database 2.

Step S56: The data computing unit 12 periodically obtains the usage information 23 from the database 2 according to a pre-defined period (once per day for example).

Step S58: The data computing unit 12 calculates the usage heat of the user aimed at each apparatus data 21 according to the obtained usage information 23 in company with the weight of each attribute of each apparatus data 21.

Step S60: The data computing unit 12 stores the calculated usage heat to the database 2.

Step S62: The data computing unit 12 determines whether the usage heat is higher than the threshold upper limit or lower than the threshold lower limit. Also, the data computing unit 12 calculates the aforementioned first adjusting parameter if the usage heat is determined higher than the threshold upper limit, and calculates the aforementioned second adjusting parameter if the usage heat is determined lower than the threshold lower limit.

Step S64: The data computing unit 12 transmits the generated adjusting parameter (i.e., the first adjusting parameter or the second adjusting parameter) to the message broadcasting unit 13.

Step S66: The message broadcasting unit 13 externally broadcasts the received adjusting parameter.

Step S68: The apparatus-status collecting unit 4 receives the adjusting parameter broadcasted from the message broadcasting unit 13 and updates the currently-adopted upload-period according to the received adjusting parameter, i.e., the apparatus-status collecting unit 4 shortens its upload-period according to a received first adjusting parameter, or extends its upload-period according to a received second adjusting parameter.

Step S70: The apparatus-status collecting unit 4 starts to periodically upload the collected apparatus data 21 to the database 2 for storing according to the updated upload-period.

Step S72: The apparatus-status collecting unit 4 transmits the updated upload-period to the message broadcasting unit 13.

Step S74: The message broadcasting unit 13 transmits the received upload-period to the data computing unit 12.

Step S76: The data computing unit 12 adjusts the data transforming period according to the content of the updated upload-period.

Step S78: The data computing unit 12 stores the adjusted data transforming period to the database 2, so as to correspondingly adjust the data displaying scale adopted by the data inquiring unit 14 while producing the diagram or the chart based on the inquired apparatus data 21.

The technical solution provided by the present invention may dynamically adjust the upload-period adopted for uploading the apparatus data according to the accessing frequency of the user in accessing the apparatus data, therefore, the network traffic is released, and the apparatus resources can be prevented from being insufficient.

As the skilled person will appreciate, various changes and modifications can be made to the described embodiment. It is intended to include all such variations, modifications and equivalents which fall within the scope of the present invention, as defined in the accompanying claims.

What is claimed is:

1. A system for updating upload-period of apparatus data, comprising:
    a server, comprising a processor for executing computer-readable code, the computer-readable code comprising a user-behavior collecting unit, a data computing unit and a message broadcasting unit;
    a database;
    at least one apparatus, comprising a processor configured to execute an apparatus function and correspondingly generate an apparatus data; and
    an apparatus-status collecting unit, comprising computer-readable code configured to collect the apparatus data from the apparatus and periodically upload the collected apparatus data to the database for storing according to an upload-period;
    wherein, the user-behavior collecting unit is configured to collect usage information generated while the apparatus data stored in the databased is accessed, the data computing unit is configured to calculate an adjusting parameter according to the usage information, the message broadcasting unit is configured to broadcast the adjusting parameter to the apparatus-status collecting unit, and the apparatus-status collecting unit is configured to update the upload-period according to the adjusting parameter.

2. The system in claim 1, wherein the computer-readable code at the server further comprises a data inquiring unit, the data inquiring unit is configured to receive an external operation for accessing the apparatus data from the database and to display the apparatus data.

3. The system in claim 2, wherein the user-behavior collecting unit is configured to record the usage information while the data inquiring unit is receiving the external operation.

4. The system in claim 3, wherein the usage information comprises a usage duration of a user staying at the data inquiring unit and an extracting frequency of the data inquiring unit in accessing the apparatus data, the data computing unit is configured to calculate a usage heat of the apparatus data according to the usage duration, the extracting frequency and a weight of an attribute of the apparatus data, and calculates the adjusting parameter based on the usage heat.

5. The system in claim 4, wherein the data computing unit is configured to generate a first adjusting parameter when the usage heat is higher than a threshold upper limit and to generate a second adjusting parameter when the usage heat is lower than a threshold lower limit, wherein the apparatus-status collecting unit is configured to shorten the upload-period according to the first adjusting parameter and to extend the upload-period according to the second adjusting parameter.

6. The system in claim 5, wherein the database stores a default parameter, and the data computing unit is configured to calculate the threshold upper limit and the threshold lower limit according to the default parameter.

7. The system in claim 1, further comprising an operating-behavior collecting unit connected with the at least one apparatus, the operating-behavior collecting unit comprising computer-readable code is configured to record an operating information while a user operates the apparatus, and the data computing unit is configured to calculate a usage heat of the apparatus according to the operating information and to calculate the adjusting parameter according to the usage heat.

8. The system in claim 3, wherein the apparatus data stored in the database is read and transformed periodically by the data computing unit according to a data transforming period, the data computing unit is configured to generate a data displaying scale according to the content of the data transforming period, and the data inquiring unit is configured to display the transformed apparatus data as a diagram or a chart according to the data displaying scale.

9. The system in claim 8, wherein the data computing unit is configured to update the data transforming period according to the content of the upload-period being updated and to update the data displaying scale according to the content of the updated data transforming period, wherein the updated data transforming period is longer than the updated upload-period, and the updated data displaying scale is proportional to the updated data transforming period.

10. A method for updating upload-period of apparatus data, comprising following steps:
    a) generating a threshold upper limit and a threshold lower limit according to a default parameter and storing the threshold upper limit and the threshold lower limit in a database by a server, the server comprising a processor for executing computer-readable code, the computer-readable code comprising a user-behavior collecting unit, a data computing unit and a message broadcasting unit;
    b) continually collecting, by an apparatus-status collecting unit comprising computer-readable code, an apparatus data from at least one apparatus and periodically uploading the collected apparatus data to the database according to an upload-period;
    c) collecting usage information generated while the apparatus data stored in the databased is accessed by the user-behavior collecting unit;
    d) calculating a usage heat of the apparatus data according to the usage information by the data computing unit;
    e) generating a first adjusting parameter when the usage heat is determined higher than the threshold upper limit and generating a second adjusting parameter when the usage heat is determined lower than the threshold lower limit by the data computing unit;
    f) broadcasting the first adjust parameter or the second adjusting parameter to the apparatus-status collecting unit by the message broadcasting unit; and
    g) shortening the upload-period according to the first adjusting parameter or extending the upload-period according to the second adjusting parameter by the apparatus-status collecting unit.

11. The method in claim 10, wherein the computer-readable code at the server further comprises a data inquiring unit, and the method further comprises following steps:
    h1) receiving an external operation for accessing the apparatus data stored in the database by the data inquiring unit; and
    h2) displaying the accessed apparatus data by the data inquiring unit.

12. The method in claim 11, wherein in the step c), the user-behavior collecting unit records the usage information while the data inquiring unit is receiving the external operation.

13. The method in claim 12, wherein the usage information comprises a usage duration of a user staying at the data inquiring unit, and an extracting frequency of the data inquiring unit in accessing the apparatus data; wherein in the step d), the data computing unit calculates the usage heat according to the usage duration, the extracting frequency and a weight of an attribute of the apparatus data, and the data computing unit calculates first adjusting parameter or the second adjusting parameter according to the usage heat.

14. The method in claim 10, further comprising following steps:
    i1) recording an operating information by an operating-behavior collecting unit comprising computer-readable code while a user operates the apparatus; and
    i2) calculating the usage heat of the apparatus according to the operating information by the data computing unit, and generating the first adjusting parameter when the usage heat is determined higher than the threshold upper limit and generating the second adjusting parameter when the usage heat is determined lower than the threshold lower limit.

15. The method in claim 13, further comprising following steps:
    j1) periodically reading and transforming the apparatus data inside the database according to a data transforming period by the data computing unit; and
    j2) generating a data displaying scale according to the content of the data transforming period by the data computing unit,
    wherein in the step h2), the data inquiring unit displays the apparatus data being transformed as a diagram or a chart according to the data displaying scale.

16. The method in claim 15, further comprising a step:
    k) updating the data transforming period according to the content of the shortened upload-period or the extended upload-period by the data computing unit, wherein the updated data transforming period is longer than the shortened upload-period or the extended upload-period.

17. The method in claim 16, further comprising a step:
    l) updating the data displaying scale according to the content of the updated data transforming period by the data computing unit, wherein the updated data displaying scale is proportional to the updated data transforming period.

* * * * *